(12) United States Patent
Nicholson et al.

(10) Patent No.: US 11,572,009 B2
(45) Date of Patent: Feb. 7, 2023

(54) COVERING DEVICE, BODY PART AND MOTOR VEHICLE

(71) Applicant: MOTHERSON INNOVATIONS COMPANY LIMITED, London (GB)

(72) Inventors: James Nicholson, Lonsdale (AU); Shane Randell Koehne, Lonsdale (AU); Scott Edwards, Lonsdale (AU); Simon Belcher, Lonsdale (AU); Jacob Heath Messenger, Lonsdale (AU); Matthew Chapman-Winter, Lonsdale (AU); Abdon Edward Saenz de Viteri, Farmington Hills, MI (US); Sam Thoday, Hallett Cove (AU); Ilka Rötzer, Kemnath (DE); Matthias Koller, Stuttgart (DE); Andreas Herrmann, Stuttgart (DE); Gary Dekievit, Lonsdale (AU); Simon David Field, Lonsdale (AU); Dean Caruso, Lonsdale (AU); Bill Frank, Lonsdale (AU); Marla Johnston, Farmington Hills, MI (US)

(73) Assignee: Motherson Innovations Company Limited, London (GB)

( * ) Notice: Subject to any disclaimer, the term of this patent is extended or adjusted under 35 U.S.C. 154(b) by 0 days.

(21) Appl. No.: 17/420,892

(22) PCT Filed: Jan. 6, 2020

(86) PCT No.: PCT/EP2020/050142
§ 371 (c)(1),
(2) Date: Jul. 6, 2021

(87) PCT Pub. No.: WO2020/144140
PCT Pub. Date: Jul. 16, 2020

(65) Prior Publication Data
US 2022/0097597 A1    Mar. 31, 2022

(30) Foreign Application Priority Data

Jan. 10, 2019    (DE) .................... 10 2019 100 520.5

(51) Int. Cl.
*B60Q 1/00*  (2006.01)
*B60Q 3/14*  (2017.01)
(Continued)

(52) U.S. Cl.
CPC ............ *B60Q 1/0035* (2013.01); *B60K 35/00* (2013.01); *B60Q 1/44* (2013.01); *B60Q 1/50* (2013.01);
(Continued)

(58) Field of Classification Search
CPC .......... B60Q 1/0035; B60Q 1/50; B60Q 3/14; B60Q 3/54
See application file for complete search history.

(56) References Cited

U.S. PATENT DOCUMENTS

| 10,899,299 B1 * | 1/2021 | Ali ......................... B60R 16/03 |
| 2009/0286072 A1 * | 11/2009 | Kuchler ................. H01H 9/182 |
| | | 428/411.1 |

(Continued)

FOREIGN PATENT DOCUMENTS

| DE | 102018006830 A1 * | 2/2019 | |
| WO | WO-2010102777 A1 * | 9/2010 | ............. B60Q 3/004 |

*Primary Examiner* — Jong-Suk (James) Lee
*Assistant Examiner* — Christopher E Dunay
(74) *Attorney, Agent, or Firm* — Jones Day

(57) ABSTRACT

A covering device for arrangement on at least one outer or one inner region of a motor vehicle includes at least one form element which is produced and/or can be produced by means of injection moulding and has an inner side oriented towards the motor vehicle and an outer side oriented away from the motor vehicle, one or more lighting devices for emitting light. The covering device also includes at least one covering element which, for covering the form element at (Continued)

least in regions, is arranged at least in regions on the outer side of the form element, at least part of the light emitted by the lighting device being able to pass through the form element and/or the covering element.

13 Claims, 5 Drawing Sheets

(51) Int. Cl.

| | | |
|---|---|---|
| B60Q 3/54 | (2017.01) | |
| F21S 43/14 | (2018.01) | |
| F21S 43/20 | (2018.01) | |
| B60K 35/00 | (2006.01) | |
| B60Q 1/44 | (2006.01) | |
| B60Q 1/50 | (2006.01) | |
| B60R 13/00 | (2006.01) | |
| B60R 13/04 | (2006.01) | |
| G09F 21/04 | (2006.01) | |
| F21W 103/60 | (2018.01) | |

(52) U.S. Cl.
CPC ............. *B60Q 3/14* (2017.02); *B60Q 3/54* (2017.02); *B60R 13/005* (2013.01); *B60R 13/04* (2013.01); *F21S 43/14* (2018.01); *F21S 43/26* (2018.01); *G09F 21/04* (2013.01); *B60K 2370/152* (2019.05); *F21W 2103/60* (2018.01)

(56) References Cited

U.S. PATENT DOCUMENTS

| | | | | |
|---|---|---|---|---|
| 2010/0182143 | A1* | 7/2010 | Lynam | ............... B60R 1/0602 |
| | | | | 340/465 |
| 2013/0214915 | A1* | 8/2013 | Nikol | ............... G09F 21/04 |
| | | | | 340/425.5 |
| 2016/0245475 | A1* | 8/2016 | Dubosc | ............... B60Q 1/0035 |
| 2017/0368986 | A1* | 12/2017 | Benboujema | ........ B60Q 1/2661 |
| 2018/0304801 | A1* | 10/2018 | Salter | ............... B60Q 1/34 |
| 2020/0103093 | A1* | 4/2020 | Negel | ............... B60R 13/02 |
| 2021/0148535 | A1* | 5/2021 | Kim | ............... G09F 13/044 |
| 2021/0284078 | A1* | 9/2021 | Hinchman | ........ B60R 11/0235 |
| 2021/0380034 | A1* | 12/2021 | Kleo | ............... F21S 43/19 |

\* cited by examiner

COVERING DEVICE, BODY PART AND MOTOR VEHICLE

CROSS-REFERENCE TO RELATED APPLICATIONS

This application is a National Stage Entry of International Patent Application No. PCT/EP2020/050142, filed Jan. 6, 2020, which claims the benefit of foreign priority to German Patent Application No. DE 10 2019 100 520.5, filed Jan. 10, 2019, each of which is hereby incorporated by reference herein in its entirety for all purposes.

BACKGROUND

1. Field of the Invention

The present invention relates to a covering device for arrangement on at least one outer or one inner region of a motor vehicle, a bodywork component for a motor vehicle comprising such a covering device and a motor vehicle comprising such a covering device and/or such a bodywork component.

2. Related Art

In order to improve road safety, motor vehicles are known to have different means of lighting, for example to illuminate the road area in front of the vehicle or to ensure that the vehicle itself can be seen by other road users by means of appropriate rear lamps. However, it has been shown that although the state of the art lighting fixtures generally offer good safety, they are not optimally suited for lateral illumination of the vehicle, as there is often not enough space available for the arrangement of conventional lighting fixtures. In addition, previously known lighting devices are often not very flexible with regard to individual design specifications and are therefore expensive to use if they are to be used in a large number of different models of motor vehicles.

It is therefore the task of the present invention to provide a robust device which can overcome the disadvantages of the state of the art and which, in particular, allow an improved illumination of the motor vehicle and its surroundings, while at the same time providing cost-effective production and the greatest possible freedom of design.

SUMMARY

This task is solved according to a first aspect of the invention by comprising a covering device for arranging on at least one outer or inner position of a motor vehicle: at least one form element which is produced and/or can be produced by injection moulding and has an inner side facing the motor vehicle and an outer side facing away from the motor vehicle to a space inside the vehicle or to a space outside the vehicle; at least one covering element which is arranged at least in regions on the outer side of the form element for covering the form element at least in regions; one or more lighting devices, the lighting device being arranged on the inner side of the form element or at least connected to the inside and the form element covering the lighting device; at least part of the light emitted by the lighting device being able to pass through the form element and the covering element to the space inside the vehicle or to the space outside the vehicle in at least a first region of the covering device, the form element being translucent at least in the first region and the covering element being translucent at least in the first region or having a passage opening.

The first region can have any shape and size suitable for allowing light from the lighting device to pass through the covering element. The term translucency refers to the at least partial light transmission of the form element and/or the covering element. Both elements can be completely or partially transparent, whereby the complete or partial transparency can only be present in certain areas of the form element and/or the covering element, while the other areas, for example, cannot be transparent. Translucency may also designate a wavelength-dependent full or partial transparency so that light of a wavelength or a limited wavelength range, for example the red green, yellow and/or blue wavelength range, can at least partially pass through the shape element and/or the covering element.

Depending on the application, the illuminating device may be designed as a point source of light, an area emitter or a planar or linear arrangement of several light sources. With a large number of light sources, the light from the light sources can overlap or pass through the covering device parallel to one another to illuminate a larger area, for example the covering element.

The fact that the lighting device is arranged on the inside of the form element or is at least connected to the inside and that the form element covers the lighting device makes it robustly protected against external influences.

It is particularly preferable that the covering device further comprises at least one light guide, in particular for distributing at least part of the light emitted by the lighting device to at least the first region.

It may also be provided that the translucency of the form element and/or the covering element can be adjusted in the first region in the injection moulding process and/or that various translucencies can be introduced in the injection moulding process.

The covering device may be provided as a single covering device or composed of a plurality of separate covering devices for forming a common multi-part covering device for attachment to a plurality of separate areas of the motor vehicle, in the case of the multi-part covering device, the individual separate covering devices being provided for attachment to mutually movable areas of the motor vehicle so that the mobility of these areas is not obstructed by the covering devices.

In one design form, the covering element comprises at least one metal coating. The metal coating can include a chromium-containing layer, preferably a chromium alloy or a doped chromium layer. The term "metal coating" may refer to a single layer or a stack of layers consisting of several layers. The metal coating can be produced using thin-film technology. Thin-film technologies are, for example, physical gas deposition processes such as vapour deposition or sputtering or chemical gas deposition processes such as CVD. Depending on the desired properties of the metal coating, the deposited layers can still be suitably reworked.

It may also be provided that the covering device further comprises at least one display means, preferably at least one emblem. It is also preferred that the display means is arranged at least partially in the first region, that the display means is designed at least regionally and/or at least partially translucent, in particular transparent, and is arranged at least in the first region. Here, the covering element can cover at least some areas of the display element.

It can also be advantageous that the form element forms at least one projection or cavity to accommodate the lighting device.

It is also proposed with the invention that the lighting device comprises at least one light emitting diode (a so-called LED) or an organic light emitting diode (an OLED), preferably flexible LEDs arranged on at least one flexible band or flexible OLEDs, preferably the LEDs or OLEDs are arranged on the inside of the form element and/or the display means.

It is particularly preferred that the lighting device comprises at least one display device, preferably at least one monitor, in particular an LCD monitor, for displaying at least one display, preferably a logo and/or an emblem.

It may also be provided that the lighting device comprises at least one projection device for projecting at least one piece of information, preferably a logo, onto at least one surface and/or an illuminating device, in particular a ground light and/or a puddle lamp, for illuminating at least one surface, in particular at least one region of the ground.

It is also advantageously possible for the lighting device, preferably also the projection device and/or the illuminating device, to have a beam angle of 2 to 70°.

It may also be provided that the lighting device is intended for this purpose: to display different colours as a multi-coloured lighting device, play and/or display multiple images, user-related ads, in particular conveyed through key-specific information, In a further design it is planned that: the lighting device is clipped, braced, glued, screwed and/or otherwise connected to the motor vehicle, the lighting device is connected or can be connected to the brake lighting circuit, and/or the dimensions of the lighting device are between 5 mm×5 mm and 25 cm×40 cm.

It is also preferred that different lighting devices are used to provide different information for a large number of lighting devices.

Further, it may be advantageous that the covering device comprises a plurality of light guides, wherein at least a first one of the light guides distributes light to at least one of the first regions and at least a second one of the light guides distributes light to at least another first region. In further designs, further light guides can distribute light from at least two of the multitude of light sources to the first region or further light guides can distribute light from further light sources to further first regions.

This task is solved according to a second aspect of the invention by a body part for a motor vehicle comprising at least one covering device according to an embodiment. With such a covering device, not only can the corresponding body areas be covered, but welding spots on the body can also be concealed if necessary. The same applies to adhesive dots or seals that are to be concealed.

This task is solved according to a third aspect of the invention by a motor vehicle comprising at least one covering device in at least one execution form according to the first aspect of the invention.

In one version, the covering device is arranged as a one-piece covering device or as a multi-piece covering device consisting of several separate parts on the motor vehicle, whereby in the case of the multi-piece covering device the individual parts are arranged on mutually movable areas of the motor vehicle. Areas of the motor vehicle that move against each other are, for example, different doors or the respective doors to the adjacent A, B or C pillars of the motor vehicle or the roof of the motor vehicle. The same applies to movable lids, flaps, trunk doors or flaps to the surrounding vehicle areas. In the case of multi-part covering devices, the lighting devices are supplied with power separately from each other, whereby each part of the covering device can be supplied as already described for the preceding single-part covering device or can be connected to other circuits, e.g. the flasher, door light, etc.

In a further version, the one-piece covering device covers a door region, preferably from one pillar part to the other pillar part of the same door region, or covers at least one region of the roof of the motor vehicle above the door region as a roof moulding or as a roof covering. In this case, the roof covering or the roof trim strip may extend continuously from a position in the region of an A-pillar of the motor vehicle to at least one position in the region of a C-pillar of the motor vehicle.

In another version, the one-piece covering device is arranged as a spoiler in the roof area or in the area of a rear window or in the area of a vehicle rear. The spoiler may extend from one side of the motor vehicle to the other side of the motor vehicle.

In a further version, the multi-part covering device extends over different door areas on the side of the vehicle. For example, this can extend from a position in the area of the A-pillar to a position in the area of the C-pillar. In one version, the multi-part covering device is arranged as a door manhole strip.

The terms "in the area of the A-pillar, C-pillar, roof, rear window, rear of vehicle" mean that the covering device extends from one location on the A-pillar, C-pillar, roof, rear window, rear of vehicle to the other corresponding locations or that the covering device at least adjoins them.

The invention is thus based on the surprising insight that a covering device which can be placed on the outside or o the inside of a motor vehicle in accordance with the invention can increase road safety by providing appropriate lighting devices for emitting light together with the covering device. This shows that the covering device can be used for almost any motor vehicle, as the physical design of the form element offers great freedom of design. This means that even complicated structures of the vehicle or its bodywork can be reproduced without any problems in order to arrange the covering device seamlessly on it. Above all, the inventors recognised that the form element could be produced by injection moulding in a particularly simple and cost-effective manner. This, in turn, makes it possible at low cost to provide an inventive covering device for different batches and/or different models of a motor vehicle, since only the form element has to be replaced accordingly in each case, while the remaining components can be used unchanged as far as possible. The inventors have also recognised that the stability of the entire covering device can be significantly increased by providing a covering element to cover at least some areas of the form element. Depending on the shape of the covering device, the shape of the motor vehicle in the area of the covering device can also be modified as required.

The light emitted by the lighting device can pass through a first region of the covering device, and the properties of the light, such as intensity and colour in particular, can be very easily adjusted by means of a suitable design of this first region. The appearance of a surface spotlight can also be comfortably achieved, which further increases safety.

This specific design can already be achieved during the manufacture of the form element by appropriate consideration in the injection moulding process, as was surprisingly found out. In addition, as an alternative or in addition, the covering element can also be used to adjust the transmission properties in the first region, provided that the covering element completely or partially covers the first region. This means that even in the case of covering devices with the same shape element, a change in the light emitted from the covering device can only be achieved by varying the covering element. This is therefore particularly advantageous for individual adaptations of the covering device.

In particular, adjusting the translucency of the form element and/or covering element in the first region can be a particularly advantageous option here. In this respect, the inventors also recognized that it is possible to form the first region as a passage opening, so that in the first region there is no material of the mold element and/or covering element. This makes it possible to set a maximum transmission of light through the first range. Alternatively or in addition, the arrangement of a display medium within the first region, such as an emblem, can also be implemented very advantageously. The display medium in turn can influence the transmission properties of the light, for example by showing translucent and/or opaque areas. For example, the display can be used to inform other road users when necessary by activating the lighting in the corresponding first region.

The inventors recognized that more than one light source and/or more than one light guide can be used. Thus, several light sources can be assigned to several first regions, so that the lighting can be controlled individually. Or several light sources can be assigned to a single first region, for example to achieve color effects in the first region. Or a combination of both.

The lighting device, in particular in the form of a light-emitting diode, may be located directly or at least partially behind the first region. With the help of a light guide, for example, the lighting device can also be arranged spatially separate from the first region and light can be guided from there to the first region. This allows even greater scope for design, since a first region, i.e. light emission, is very easy to realise for electronic components even where space is limited locally, since the lighting device itself does not have to be arranged in the first region. In addition, several light guides make it possible, for example, to illuminate several first regions with a single light source, with the first regions having different transmission properties and thus meeting different lighting requirements.

By using a metal coating, e.g. a chrome coating, as the covering element, the transmission properties of the light can be particularly advantageously adjusted. In addition, a uniform appearance of the covering element can also be achieved, so that other road users are not unnecessarily distracted. Thus, lighting devices such as LCD monitors can also be arranged behind the metal coating, in particular in the form of a chrome strip with a chrome coating. Thus the display, like an emblem and/or logo, of the lighting device is only visible after its activation, when it then shines through the covering element.

Furthermore, it is particularly preferred if the covering element is manufactured using thin-film technology, e.g. a chromium coating that allows light to pass through the coating.

The inventors have identified light-emitting diodes (LEDs) or red-green-blue (RGB) LEDs, i.e. LEDs that emit coloured light, as the preferred lighting device. This means that a first region can be illuminated with a single light source in colour, or with a single light guide if necessary, which is particularly easy to implement and inexpensive to manufacture. In addition, organic light-emitting diodes (OLEDs) can also be used particularly advantageously, since they are already a surface emitter in their own right and thus bring with them very preferred properties for the invention's underlying idea of increasing safety.

Surprisingly, however, it was also found that, alternatively or in addition, the lighting device can also include at least one display device. This allows individual displays to be designed, for example, depending on the driver and/or on an ambient situation such as approaching vehicles.

Alternatively or in addition, the lighting device may also include at least one projection device capable of projecting a display on a surface such as the ground, thus enabling important messages to be displayed and thus increasing safety for all road users.

Alternatively or in addition, the illuminating device may advantageously include at least one illuminating device capable of illuminating a surface. For example, the area in front of the motor vehicle to increase safety for the passengers when entering the motor vehicle.

In particular, it is advantageous to be able to freely program the lighting device, in particular the display device, the projection device and/or the illumination device. Thus individual needs can be considered. In addition, where there is more than one lighting device, each lighting device may provide different information.

In the case of the lighting device, in particular display device, projection device and/or illuminating device, it is particularly surprising that they can be provided in a very simple manner with the covering device, for example by the form element forming a projection, which in turn forms a cavity within which the devices, but also the light source(s), can be arranged. However, the lighting device may also be mounted directly on the motor vehicle.

The invention therefore also makes it possible, in particular, for lighting devices not only to be located inside the vehicle or at fixed points, but also to make it possible to provide such lighting devices at basically any position on the outside of the vehicle by setting up a corresponding first region there.

BRIEF DESCRIPTION OF DRAWINGS

Further characteristics and advantages of the invention result from the following description, in which preferred forms of execution of the invention are explained by means of figures.

DETAILED DESCRIPTION

Figure 1:
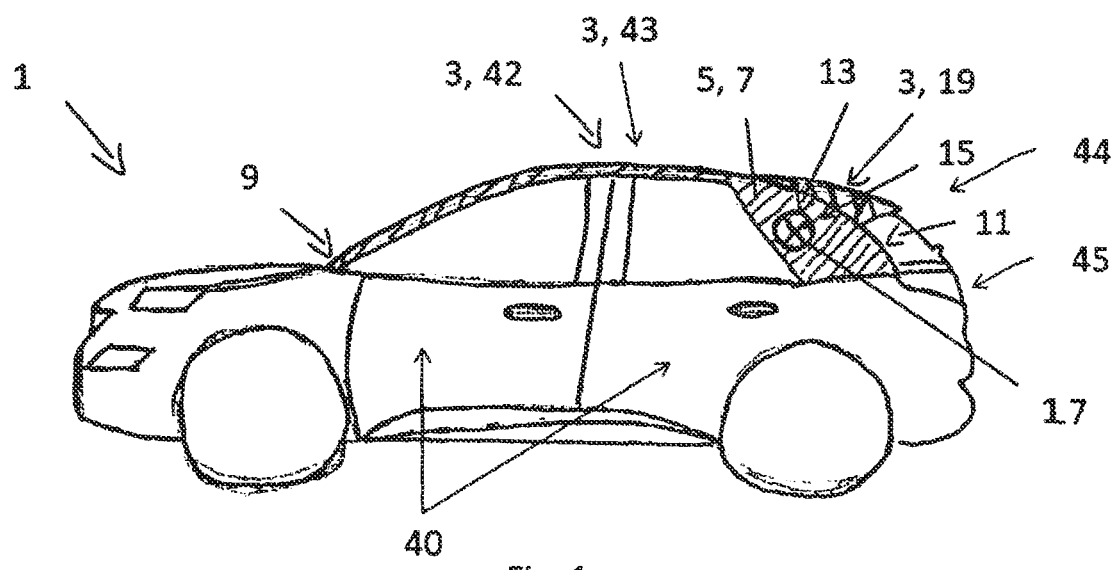
FIG. 1 is a schematic representation of a motor vehicle with an inventive covering device in accordance with a first design.

FIG. 1 shows a schematic representation of a motor vehicle 1 according to the third aspect of the invention in a first form. This has an inventive covering device 3 according to the first aspect of the invention in a first execution form.

The covering device 3, shown here as a one-piece covering device, comprises a form element 5 which can be produced by an injection moulding process and which reproduces the desired shape of the corresponding side section of the motor vehicle 1. The form element 5 is covered with a covering element 7 in the form of a chrome coating. Covering element 7 covers or is arranged on the entire surface area of the form element 5 pointing outwards. In FIG. 1, the corresponding area is highlighted hatched. This clearly shows that the covering device 3 extends laterally and longitudinally of the motor vehicle 1 as a roof trim 42 above the door area 40, from a position 9 in the area of the A-pillar of the motor vehicle 1 continuously to a position 11 in the area of the C-pillar of the motor vehicle 1. Likewise the covering device 3 could cover a door region 40 preferably from one pillar part to the other pillar part of the same door region 40 or as roof covering 43 at least one region of the roof 41 of the motor vehicle 1, wherein the roof covering 43 could extend continuously from a position 9 in the region of an A-column of the motor vehicle 1 to at least one position 11 in the region of a C-column of the motor vehicle 1.

The covering device 3 has a lighting device 21 (not shown in FIG. 1) (see FIGS. 4-6) for emitting light, which is covered by the form element 5 or the covering element 7 in plan view from the outside. A part of the light emitted by the lighting device may pass out through the moulding 5 and the covering element 7 in at least a first region 13 of the covering device 3 located in the area of the C-pillar of the motor vehicle 1. In the first region, 13, the forming element 5 and the covering element 7 have a passage opening 15. In the first region 13 and within the passage opening 15, a display means 17 in the form of an emblem is arranged which is enclosed by the covering device 3. The display means 17 is designed to be translucent in some areas and can therefore be illuminated from behind by light from the lighting device 21, which emerges visibly outwards at the translucent points.

The motor vehicle 1 also has a further covering device 3 in accordance with the first aspect of the invention, in a second design which extends transversely and in the transverse direction of the motor vehicle 1, namely a spoiler 19, which extends continuously from a position 11 in the region of the C-pillar on one side of the motor vehicle 1 to the same position on the other side of the motor vehicle 1. The spoiler 19 in other versions could not be arranged above the rear window 44, but at the rear of the vehicle 45.

In another design form not shown in FIG. 1, in a first region 13 of the covering device 3, the light from a lighting device 21 surrounded by the covering device 3 can exit in a first region 13 of the covering device 3, which is translucent both in the form element 5 and in the covering element 7, and thus produce a flat luminous impression.

Figure 2:
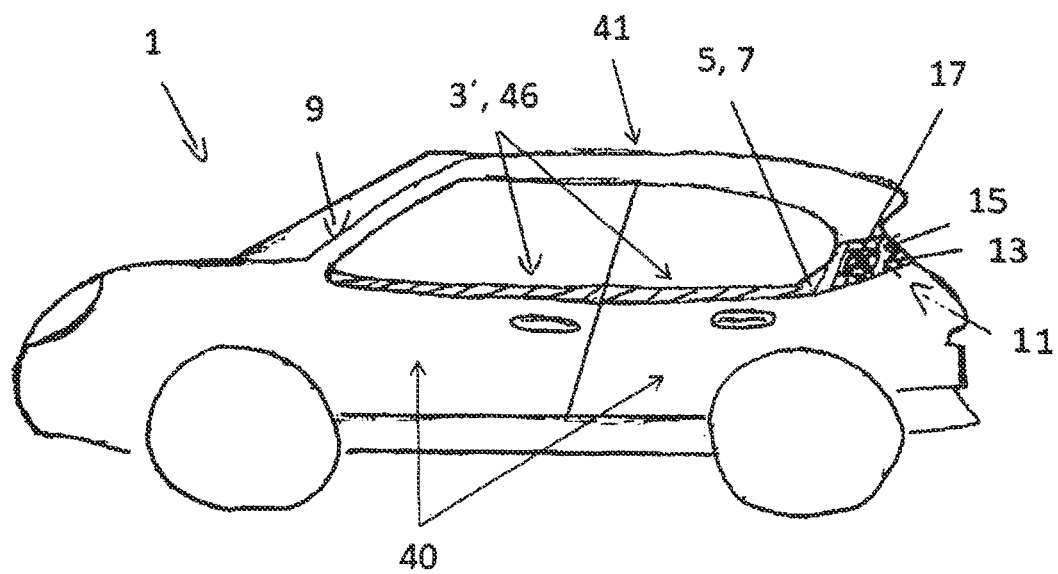
FIG. 2 is a schematic representation of a motor vehicle with a covering device according to the invention according to a further design.

FIG. 2 shows a schematic representation of a motor vehicle 1 in accordance with the invention according to the third aspect of the invention a further design. The elements and operation of the invention multi-part covering device 3' correspond as far as possible to the elements and operation modes shown in FIG. 1, where the individual parts of the multi-part covering device 3' are arranged on the two doors 40 as movable areas of motor vehicle 1 against each other. So that both doors can be opened further separately, the part of the 3' covering device on the front door 40 is designed separately to the other part on the rear door 40. There is no covering device on roof 41. Of course the forms of FIGS. 1 and 2 can be combined with each other.

As can be seen from FIG. 2, the design of the covering device 3' differs from that of the covering device 3 in FIG. 1 in terms of its physical shape. For example, the covering device 3' does not run laterally above but below the windows of motor vehicle 1 as a door shaft strip 46. The position of the display means 17 also differs. This underlines the high design freedom, which is made possible by the inventive covering devices 3, 3'.

Figure 3:
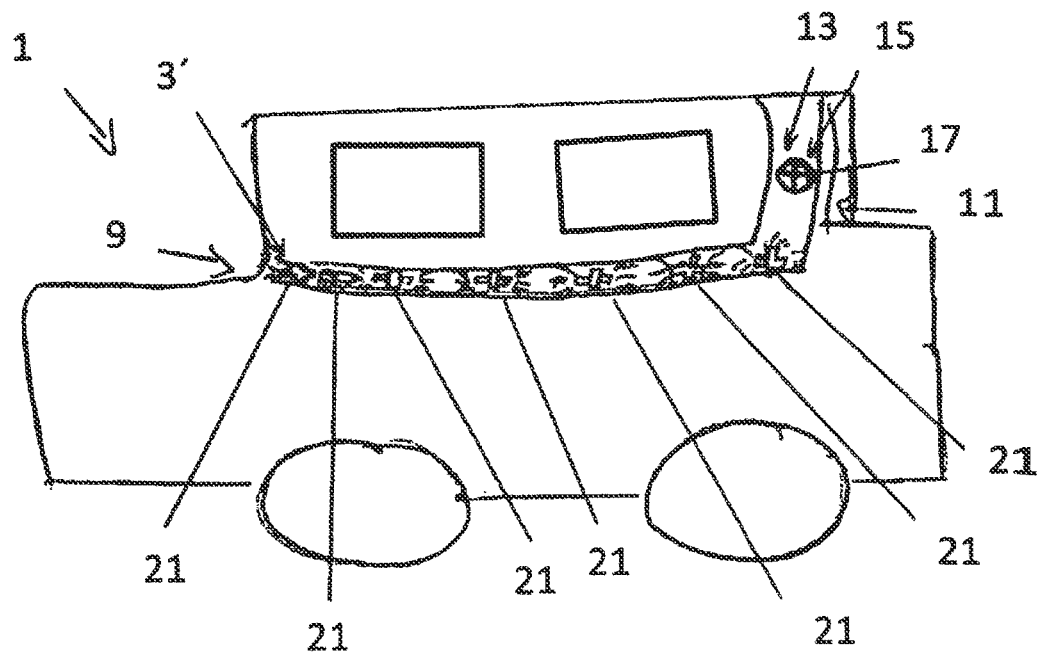
FIG. 3 is a schematic representation of a motor vehicle with a covering device in accordance with the invention in a further design form.

FIG. 3 shows a schematic representation of a motor vehicle 1 according to the invention in another design form. This has an inventive multi-part covering device 3', the elements and functions of which correspond as closely as possible to the designs in FIGS. 1 and 2.

For reasons of clarity, neither the form element 5 nor the covering element 7 of the covering device 3' is shown in detail in FIG. 3. The seven lighting devices 21 can be identified for this purpose. Each of the lighting devices 21 is distributed over various positions behind the form element 5 and the covering element 7. The form element 5 and the covering element 7 are both translucent in this area. This achieves a wide-area lighting effect along the entire side surface of vehicle 1. In addition, light guides (not explicitly shown in FIG. 3) are used which are included in the 3' covering device. These also direct the light from the individual lighting devices 21 to other points within the respective first region, making the lighting effect more uniform. Lighting device 21 shall preferably include light-emitting diodes. Another lighting device, which is not visible in FIG. 3, is located behind the display means 17.

Figure 4:
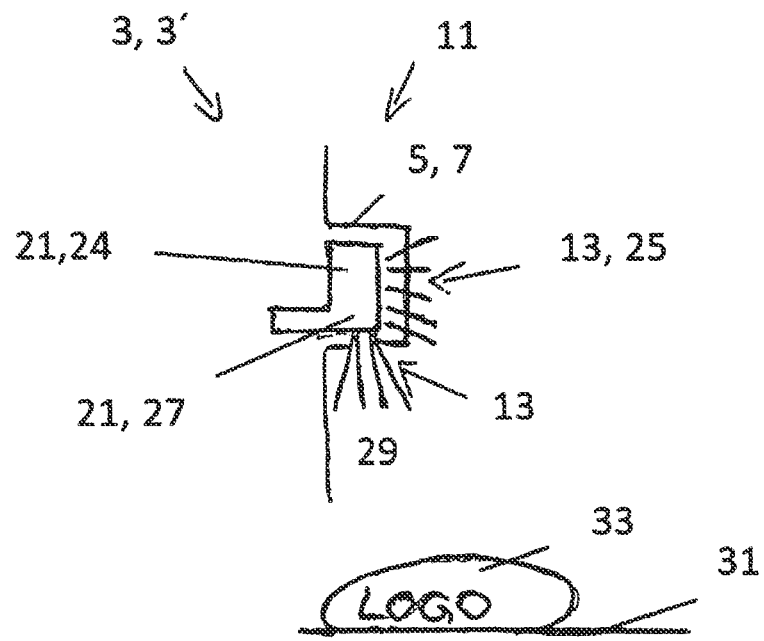
FIG. 4 is a schematic cross-sectional representation of an inventive covering device in a further design form.

FIG. 4 shows a schematic cross-sectional representation in a further version of an inventive covering device 3, 3'.

In the lateral section, the cross-section passes through position 11 of the covering device 3, 3' in the area of the C-pillar. As can be seen from FIG. 4, the covering device 3, 3' has two lighting devices 21. Namely, on the one hand, a light-emitting diode as a display device 24, the light of which passes through the form element 5 and the covering element 7 in a first translucent region 13 in the direction of the radiation of the light emission 25. And on the other hand a projection device 27, the light of which in the direction of radiation 29 passes through another first region 13 through a passage opening in the form element 5 and in the covering element 7 through the same. On a surface 31 of the ground below the covering device 3, 3', a logo 33 is projected onto the ground 31 by the projection device 27.

Figure 5:
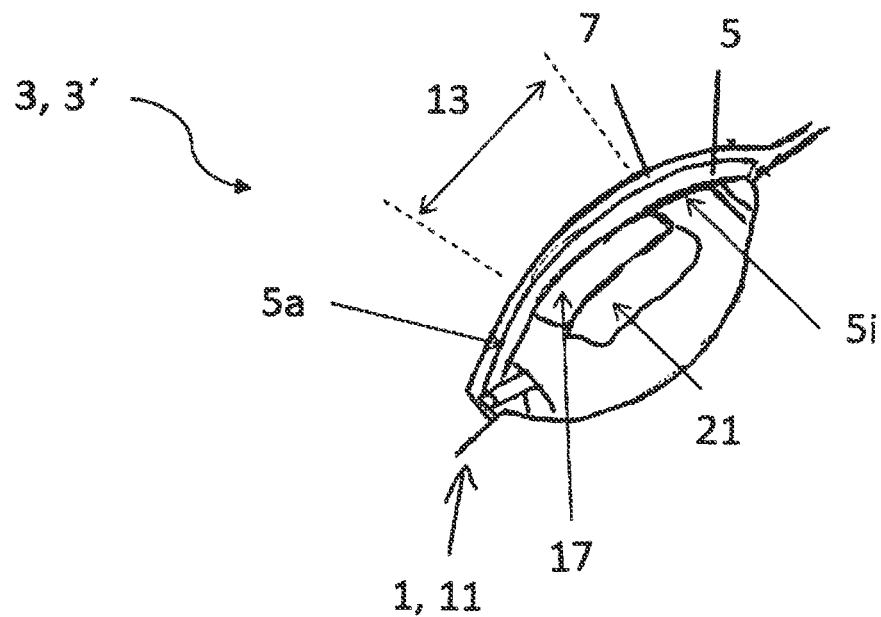
FIG. 5 is a design of the inventive covering device in the lateral cut.

FIG. 5 shows a schematic representation of a design of the covering device 3, 3' in a lateral section, from which the layers of form element 5 and covering element 7 emerge particularly clearly. In this case, the form element 5 forms a cavity on the outside of the motor vehicle 1 in which the lighting device 21 is accommodated. The covering element 7 is arranged on the outside 5a of the form element (5) to cover it to the outside. A display means 17, preferably at least one emblem, is arranged on the inside 5i of the form element. Here the display means 17 is designed at least in regions and/or at least partially translucent, in particular transparent, and is arranged in the first region 13, through which at least part of the light emitted by the lighting device 21 can pass outwards through the shaping element 5 and/or the covering element 7. The lighting device 21 is here connected via the display means 17 to the inside 5i of the form element 5 with the first region 13 covering the lighting device 21. In this design, the lighting device 21 can be a flat arrangement of several LEDs or a flat OLED. The covering element 7 comprises here at least one metal coating which is preferably produced and/or producible by means of thin-film technology. The metal coating can include a chromium-containing layer, preferably a chromium alloy or a doped chromium layer. The covering element 7 covers the display means 17.

Figure 6:
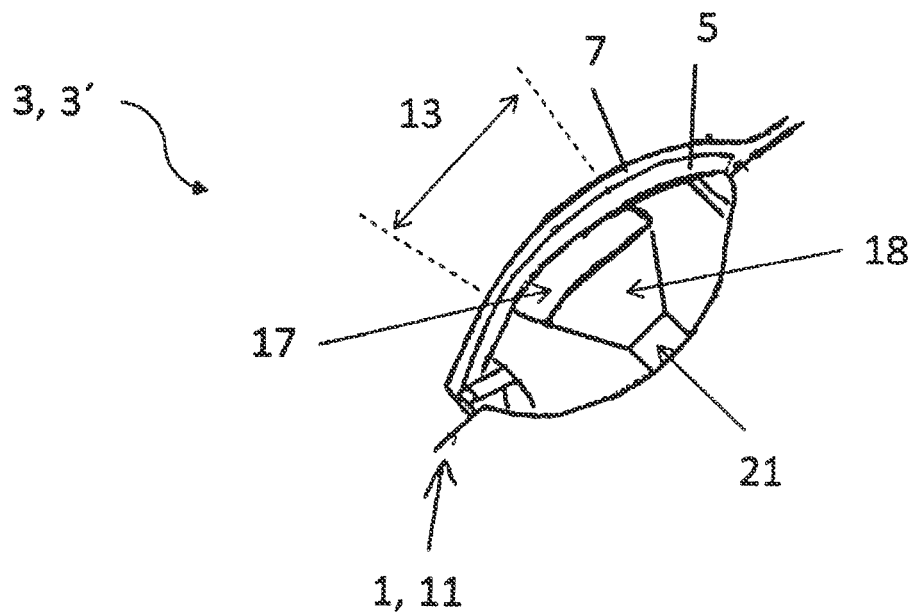
FIG. 6 is a further version of the invented covering device in the lateral cut.

FIG. 6 shows another version of the invented covering device in a lateral cut. In contrast to FIG. 5, here the lighting device 21 is not arranged on the display 17. Here the covering device 3, 3' further comprises a light guide 18 which distributes the light emitted by the lighting device 21 to the first region 13 by extending from the lighting device 21 to the display means 17. The illumination device 21 is designed as an LED or as a linear chain of LEDS. In other designs, the covering device 3, 3' could also comprise a plurality of light guides 18 and a plurality of first regions (13), wherein at least a first one of the light guides 18 distributes light to at least one of the first regions 13 and at least a second one of the light guides 18 distributes light to at least another first region 13. For the remaining components, please refer to the description in FIG. 5.

Figure 7:
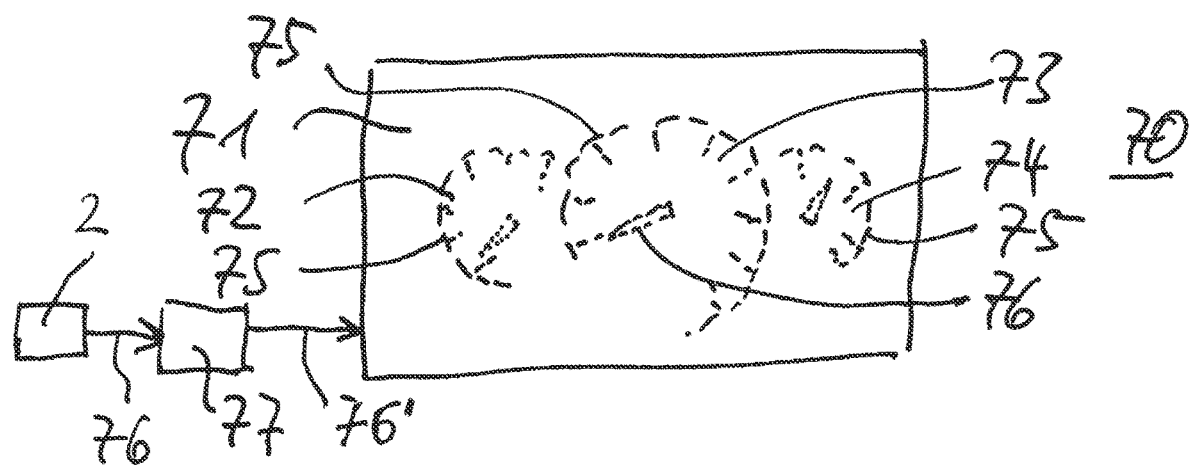
FIG. 7 is a front view on a light module control system in form of a dashboard 71.

FIG. 7 shows a light module control system 70 in form of a dashboard 71 of a motor vehicle 1. Three dynamic displays 72, 73, 74 have each an illuminated graduate scale 75 to display a dynamic input 76 from the vehicle system 2, which has been converted to a converted signal 76' for the graduate scale 75 by a control module 77. The dynamic displays 72, 73, 74 are shown in dotted lines, since depending on the operation mode of the motor vehicle 1 activated or stopped or of the operation mode of the display itself being activated or stopped, the dynamic displays 72, 73, 74 appear through the metallic coating of the dashboard 71 or not by using a light array behind the dashboard 71. The dynamic displays with the corresponding graduate scale 75 are an r.p.m. counter 72, a speedometer 73 and a fuel display means 74. Instead of a fuel display means, a battery charge display means could be used. To indicate the value of the graduated scale 75, a hand 78 can be displayed together with the graduated scale 75.

Figure 8:
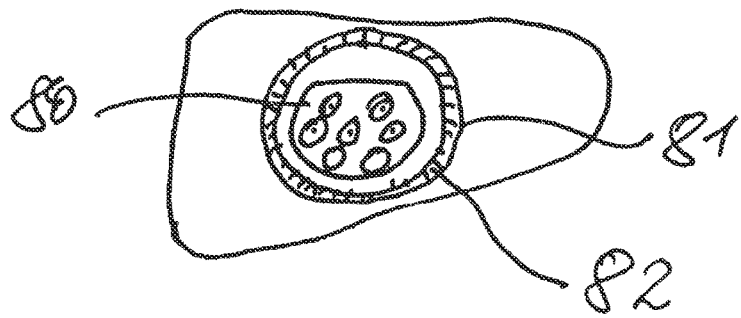
FIG. 8 is a front view on a charging port of a car surrounded by a ring.

FIG. 8 shows a charging port 80 of a car surrounded by a ring 81 which is multicolor to show the charge status at the place where a charger (not shown) is connected to the car. The color of the ring can change from red—empty to green—full or the ring 81 can have segments 82 which are switched on one after the other depending on the charging status of the battery.

Figures 9A, 9B:
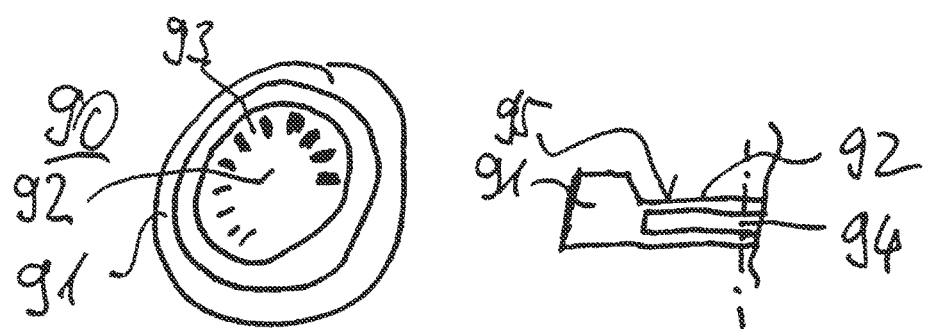
FIGS. 9*a* and 9*b* is a front view and a section on a dynamic display of a separate r.p.m. counter with a bezel.

FIG. 9a, b shows a dynamic display 90 of a separate r.p.m. counter with a bezel 91 surrounding an inner display area 92, all being covered with a metallic coating. A graduated scale 93 shows the information, when the dynamic display is activated and illuminated by an inner light source 94. Without illumination, the display 90 would appear as a metallic surface 95 only.

Figure 10:
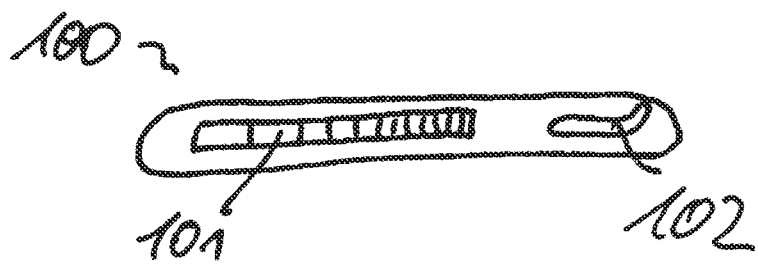
FIG. 10 is a front view on a g-force display means as an elongated dynamic display

FIG. 10 shows a g-force display means as an elongated dynamic display 100 with a graduated scale 101 and a logo 102 appearing through the metallic coating when activated and illuminated from the backside. Such a g-force display means could be placed in the field of view of the passenger to indicate the g-force during acceleration or braking of the car as well as side accelerations in driving around bends. This display could be activated if a special mode of operation is selected, for example a sport mode. This kind of display could also be used to indicate other dynamic inputs such as a r.p.m. counter.

Figure 11:
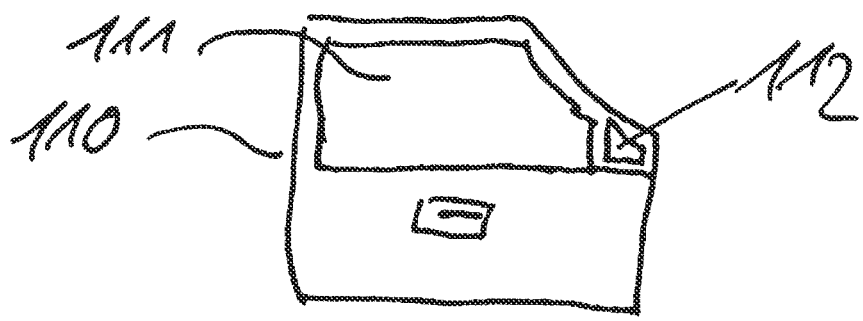
FIG. 11 is a front view on the inner side of a left front door with a veneer.

FIG. 11 shows the inner side of a left front door 110 with a window 111. The covering device is a veneer 112 surrounding at least partially the window 111 and being placed in the direction of view of an exterior mirror (not shown). The veneer 111 is covered with a metallic coating and has a hidden til lit function with functional images that appear if and when required, p. ex. a vehicle blind spot symbol (not shown).

Figure 12:
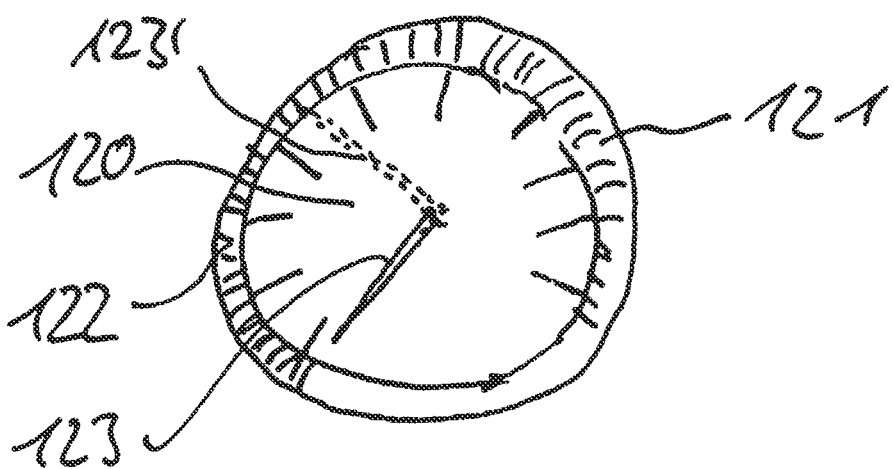
FIG. 12 is a front view on a speedometer with a surround.

FIG. 12 shows a dynamic display 120 in form of a speedometer with a surround 121 with a metallic appearance around a graduated scale 122. The surround 121 is illuminated corresponding to a value of another graduated scale not shown, p.ex. a r.p.m. counter and can change color if a shift needs to occur. The illumination of the surround 121 is independent oft the value on the graduated scale 122, indicated by the hand 123 or 123' in a different situation.

The characteristics revealed in the preceding description, in the figures and in the claims may be essential to the invention in its various forms, either individually or in any combination.

REFERENCE CHARACTER LIST

1 Car
3 (one-piece) covering device
3' (multi-part) covering device
5 Form element
5i inner side of the form element oriented towards the motor vehicle
5a outer side of the form element oriented away from the motor vehicle
7 Covering element
9 Position in the area of the A-pillar of the motor vehicle
11 Position in the area of the C-pillar of the motor vehicle
13 first region
15 opening
17 Light guide
18 Light guide
19 Spoiler
21 Lighting device
24 Display unit
25 Light emission of Display device
27 Projection device, illumination device
29 Light emission of the projection device or illuminating device
31 Area, e.g. the soil
33 Information, such as a logo
40 Door or door area of the motor vehicle
41 Roof of the motor vehicle
42 Covering device as roof molding
43 Covering device as roof covering
44 Rear window of the motor vehicle
45 Rear of the motor vehicle
46 Covering device as door shaft strip
70 light module control system
71 dashboard
72 r.p.m. counter
73 speedometer
74 fuel display means
75 graduated scale
76 dynamic input
76' converted signal
77 control module
78 hand 80 charging port
81 ring
82 segments
90 dynamic display
91 bezel
92 inner display area
93 graduated scale
94 inner light source
95 metallic surface
100 elongated dynamic display
101 graduated scale
102 logo
110 left front door
111 window
112 veneer
120 display
121 surround
122 graduated scale
123 hand
123' hand

What is claimed is:

1. A covering device for arranging on at least one outer or one inner portion of a motor vehicle, comprising:
   at least one form element which is produced by injection molding and has an inner side oriented towards the motor vehicle and an outer side oriented away from the motor vehicle to a space outside the vehicle;
   at least one covering element which is arranged at least in regions on the outside of the form element for covering the form element at least in regions, the at least one covering element having a metal coating configured to generate a substantially uniform lighting of the covering element;
   one or more lighting devices, the one or more lighting devices being arranged on the inner side of the form element or connected at least to the inner side and covered by the form element;
      wherein at least part of the light emitted by the one or more lighting devices is able to pass through the form element and the covering element to the space outside the vehicle in at least a first region of the covering device, the form element being translucent at least in the first region and the covering element being translucent at least in the first region; and
      an exterior display device including an emblem that is visible from the space outside the vehicle when the one or more lighting devices are activated and invisible from the space outside the vehicle when the one or more lighting devices are not activated.

2. The covering device according to claim 1, wherein the at least one covering element further comprises at least one light guide for distributing at least part of light emitted by the one or more lighting devices at least to the first region.

3. The covering device according to claim 1, wherein at least one of:
   the translucency of the at least one form element or of both the at least one form element and the at least one covering element is adjusted in an injection molding process; or
   different translucencies are introduced in the injection molding process.

4. The covering device according to claim 1, wherein the metal coating is produced using a thin-film technology.

5. The covering device according to claim 1, wherein the metal coating comprises a chromium-containing layer, and the chromium-containing layer is a chromium alloy or a doped chromium layer.

6. The covering device according to claim 1, wherein the one or more lighting devices comprises at least one or more light emitting diodes (LED) or organic light emitting diodes (OLED), or flexible LEDs arranged on at least one flexible band or flexible OLEDs, the LEDs or OLEDs being arranged on the inside of the at least one form element or the at least one covering element.

7. A motor vehicle, comprising at least one covering device according to claim 1.

8. The motor vehicle according to claim 7, wherein the covering device is arranged on the motor vehicle as a one-piece covering device or as a multi-piece covering device comprising a plurality of separate parts, wherein in the case of the multipiece covering device the individual parts are arranged on regions of the motor vehicle which are movable relative to one another.

9. The motor vehicle according to claim 7, wherein the covering device covers a door region or from one pillar part to the other pillar part of the same door region, or covers at least one region of the roof of the motor vehicle above the door region as a roof trim strip or as a roof covering, or the roof covering or the roof trim strip extends continuously from a position in the region of an A-pillar of the motor vehicle to at least one position in the region of a C-pillar of the motor vehicle.

10. The motor vehicle according to claim 7, wherein the covering device is arranged as a spoiler in the roof region, in the region of a rear window or in the region of a vehicle rear end, or the spoiler extends from one side of the motor vehicle to the other side of the motor vehicle.

11. The motor vehicle according to claim 7, wherein the covering device extends laterally on the motor vehicle over different door regions or from a position in the region of the A-pillar to a position in the region of the C-pillar.

12. The motor vehicle according to claim 11, wherein the covering device is arranged as a door shaft strip.

13. The motor vehicle according to claim 1, wherein the one or more lighting devices further comprise at least one projection device configured to project a display onto a surface on the space outside the vehicle.

* * * * *